H. CSANYI.
PRIMARY BATTERY.
APPLICATION FILED JULY 3, 1913.
1,102,010.
Patented June 30, 1914.
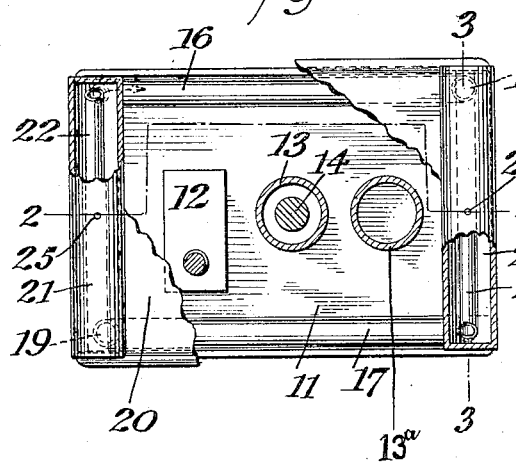
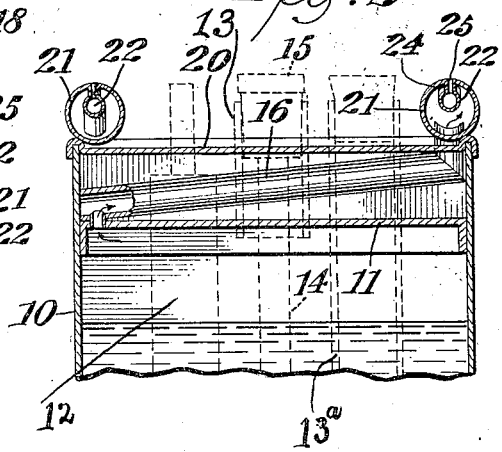
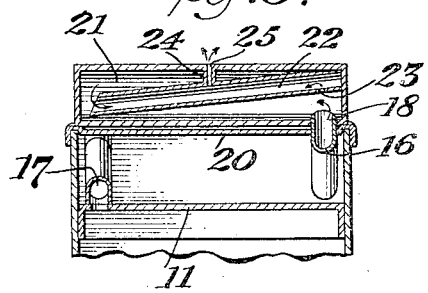
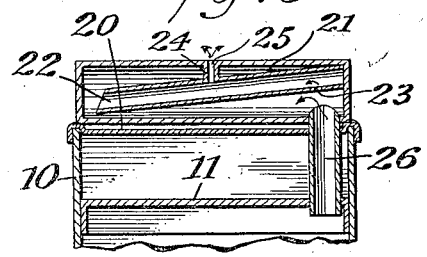
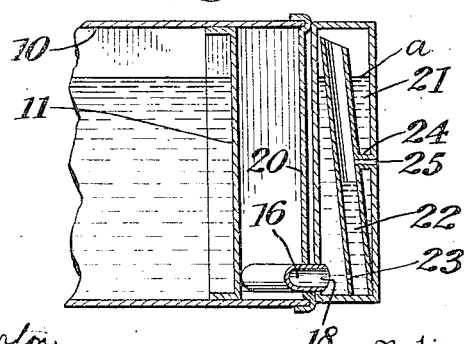
Witnesses:
E. H. Bickerton
H. Hollingsworth
Inventor
Henry Csanyi
By his Attorneys
Meyers, Cushman & Rea

UNITED STATES PATENT OFFICE.

HENRY CSANYI, OF NEW YORK, N. Y., ASSIGNOR TO MAXIVOLT PRIMARY BATTERY CO., OF NEW YORK, N. Y., A CORPORATION OF NEW JERSEY.

PRIMARY BATTERY.

1,102,010.  Specification of Letters Patent.  Patented June 30, 1914.

Application filed July 3, 1913. Serial No. 777,278.

*To all whom it may concern:*

Be it known that I, HENRY CSANYI, a subject of the King of Hungary, residing at New York, in the county of New York and State of New York, have invented new and useful Improvements in Primary Batteries, of which the following is a specification.

This invention relates to electric batteries, and particularly to gas venting means therefor, which will permit the batteries so provided being inclined or turned in various positions out of the vertical or on one side while in use without danger of leakage or escape of the electrolyte.

In batteries of the sealed type using a liquid electrolyte, especially such as are carried on the person, means must be provided for permitting the gases generated by chemical action escaping through a suitable vent, which vent must be so arranged that however severely the battery may be shaken or inclined from an upright position, the electrolyte cannot flow through the vent opening.

To this end the invention is designed to provide such a means and has for its object the placing of a chamber at the top of the battery containing a trap through which gas may vent at all times, but which will positively prevent the outflow of electrolyte.

In the accompanying drawings Figure 1 is a plan view of an electric battery with my invention applied thereo, portions of the same being broken away. Fig. 2 is a vertical sectional view of the same on the line 2—2. Fig. 3 is a vertical cross sectional view on the line 3—3 of Fig. 1. Fig. 4 is a view similar to Fig. 3, showing the battery turned on its side and illustrating means for preventing escape of the electrolyte. Fig. 5 is a sectional view showing a modification of the invention.

In the drawings, 10 indicates the cell of a battery made preferably of celluloid, and in the instance shown of rectangular cross section. The shape of the battery, however, may be changed as desired, and also the materials of which the cell is made. Near the top of the cell 10 is a horizontal partition or diaphragm 11 sealed in position to prevent the escape of the fluid electrolyte. Through the diaphragm 11 projects the carbon element 12 sealed in said diaphragm, and a cylindrical sleeve 13 through which the zinc element 14 may be inserted and removed at will, the upper end of the zinc element being provided with a resilient head or stopper 15 to fit tightly within the sleeve and prevent the electrolyte flowing therefrom should the cell be overturned, these elements being shown in dotted lines in Fig. 2. I also prefer to provide the cell 10 with a tubular chamber 13ª closed at its lower end and having a stopper closure at its upper end into which chamber the zinc element 14 may be placed when the battery is not in use. If desired the zinc element may be fixed permanently in the partition 11. Above the partition 11 upon opposite sides of the cell are two tubes 16 and 17 secured in place against the walls of the cell and opening at opposite ends into the interior thereof, from which ends said tubes extend in an upwardly inclined direction across the cell where they terminate in vertically projecting ends 18, 19, respectively, extending through the top or cover 20, said ends fitting tightly into the lower sides each of a transverse chamber 21, said chambers lying parallel to each other above the top of the battery cell, and are preferably cylindrical in form with closed ends, as shown. The chambers 21 have a cross sectional area greater than either tube 16 or 17, and each contains a small tube 22 extending longitudinally thereof, closed at the end above the connection to the tube 16 or 17 and open at its opposite end which terminates a short distance from the closed end of the chamber. These tubes 22 serve as traps to permit ready outflow of gas as generated but prevent the escape of electrolyte should it be backed up into either tube 16 or 17 and from thence into one or the other chamber 21 if the cell be shaken or turned on its side. The tubes 22 are inclined downwardly toward their open ends and have each a very minute opening 23 on its under side near the closed end. A neck 24 joins each tube 22 intermediate its ends with the wall of its containing chamber 21, through which neck a small hole 25 is made to connect said tube with the atmosphere and serving as a vent for gases generated in the battery.

Constructed as described, when in upright position, gases generated in the cell pass therefrom into the upwardly inclined tubes 16, 17, thence into the chambers 21 at one end and along said chambers to their opposite ends, passing therefrom through the trap tubes 22 and small vent openings 25 to the atmosphere.

These batteries are designed to be carried on the person and particularly by miners, and are liable therefore to be shaken and turned out of the vertical position in any direction, disturbing the electrolyte, and, were not special means provided to prevent the escape thereof, would flow out through the gas vent. By arranging one or more chambers containing traps which open in different directions, a free vent for the gases is provided and the electrolyte prevented from escaping. When the battery is turned on one side so that the chambers 21 stand vertically as in Fig. 4, the electrolyte will flow through the tube 16 or 17 whichever is lowermost into the chamber 21 connected thereto and nearly to the upper end thereof to the point a, but not sufficiently high to enter the open end of the small trap tube within the chamber. The other chamber 21 is connected to the cell through the higher tube and is above the level of the electrolyte, therefore none will enter this chamber. The minute opening 23 is so small, about one one-thousandth of an inch in diameter, that when below the surface of the electrolyte very little of the latter will pass into the trap tube 22, and it will require a long time for sufficient fluid to fill the tube to the level of the vent opening 25, a much longer time than will elapse with the batteries in this position under usual service conditions. When the battery is restored to upright position the electrolyte will immediately go back into its cell through the inclined tube 16 or 17.

If when the battery is in the position indicated in Fig. 4, it should be turned over with the open end of the trap tube 22 extending downwardly, the electrolyte would tend to go back into the cell, but if the change in position be made so quickly as to retain a portion of the electrolyte within the chamber and it should rise above the open end of the trap tube the gas generated within the cell would nevertheless be vented through the minute opening 23 into the trap tube and out through the opening 25. From this it will be clear that in whatever position the battery is liable to be temporarily placed other than complete reversal there will always be a vent for the gases and a trap to prevent the escape of the electrolyte.

Under certain conditions the inclined tubes 16 and 17 may be dispensed with and in place thereof vertical tubes 26 may extend downwardly from the ends of the chambers straight through the cover 20 and diaphragm 11 into the cell.

What I claim is:—

1. A vent for batteries comprising a closed elongated chamber traversing the top of the battery and communicating at one end with the interior thereof, and a trap in said chamber opening thereinto at one end and to the atmosphere intermediate its ends.

2. A vent for batteries comprising a plurality of closed elongated chambers at the top of the battery on opposite sides thereof, each chamber communicating at one end with the interior of said battery, and a trap in each chamber opening thereinto at one end and to the atmosphere intermediate its ends.

3. A vent for batteries comprising closed tubular chambers lying parallel with the top and on opposite sides of the battery cell, each chamber communicating at one end with the interior of said battery, and a longitudinally arranged trap in each chamber opening thereinto at the end opposite its communication with the battery and also to the atmosphere at a point intermediate its ends.

4. A vent for batteries comprising closed tubular chambers at the top and on opposite sides thereof, each chamber communicating at one end with the interior of said battery, and a trap in each chamber opening thereinto at the end opposite its communication with the battery and having a minute opening near its other end and said trap opening also to the atmosphere at a point intermediate its ends through the wall of the chamber.

5. A vent for batteries comprising closed horizontal chambers on opposite sides of the battery at the top thereof, each chamber communicating at an opposite end with the interior of said battery, and a trap in each chamber opening thereinto at the end distant from its communication with the interior of the battery, and to the atmosphere through the wall of the chamber intermediate the opening in the chamber and in the trap.

6. A vent for batteries comprising closed horizontal chambers on opposite sides of the battery at the top thereof, each chamber communicating at an opposite end with the interior of said battery, and a trap in each chamber opening thereinto at the end distant from its communication with the interior of the battery and to the atmosphere through the wall of the chamber intermediate the opening in the chamber and in the trap, said trap having further a minute opening on its under side adjacent its closed end.

7. A vent for batteries comprising a pair of parallel tubular chambers having closed ends disposed on opposite sides of the top of said battery, an inclined tube connecting one end of each chamber with the interior of the battery below the opposite end of the other chamber, and a trap in each chamber open at the end of said chamber opposite its connection with one of the inclined tubes and having a vent to the atmosphere.

8. A vent for batteries comprising a pair of parallel tubular chambers having closed ends disposed on opposite sides of the top of said battery, an inclined tube connecting one end of each chamber with the interior of the battery below the opposite end of the other chamber, and a trap in each chamber comprising an inclined tube open at one end only, said open end being adjacent the end of the chamber opposite its connection with the inclined tube and having a vent to the atmosphere intermediate its length, said trap tube also having a minute opening in its under side near its closed end.

9. A battery cell having venting means associated therewith, comprising a tube open at one end to the interior of the cell, said tube traversing the top of the cell, a closed chamber communicating with the opposite end of said tube, and a trap in said chamber opening thereinto and to the atmosphere.

10. A battery cell having venting means associated therewith, comprising tubes traversing the upper portion of the cell at opposite sides thereof and each tube open at one end to the interior of the cell, a closed chamber arranged at substantially right angles to each tube and communicating therewith at one end, and a trap in each chamber extending longitudinally thereof and opening thereinto at one end and to the atmosphere at a point intermediate its ends.

In testimony whereof I have hereunto set my hand in presence of two subscribing witnesses.

HENRY CSANYI.

Witnesses:
E. H. BICKERTON,
S. P. HOLLINGSWORTH.